(12) United States Patent
Harrison

(10) Patent No.: US 12,150,437 B2
(45) Date of Patent: Nov. 26, 2024

(54) FISH HOOK BARB DISABLER

(71) Applicant: Kenneth Harrison, Palm Beach Gardens, FL (US)

(72) Inventor: Kenneth Harrison, Palm Beach Gardens, FL (US)

( * ) Notice: Subject to any disclaimer, the term of this patent is extended or adjusted under 35 U.S.C. 154(b) by 69 days.

(21) Appl. No.: 18/171,523

(22) Filed: Feb. 20, 2023

(65) Prior Publication Data

US 2023/0200366 A1 Jun. 29, 2023

Related U.S. Application Data

(63) Continuation-in-part of application No. 17/173,261, filed on Feb. 11, 2021, now Pat. No. 11,612,157.

(60) Provisional application No. 63/135,359, filed on Jan. 8, 2021.

(51) Int. Cl.
*A01K 97/18* (2006.01)

(52) U.S. Cl.
CPC .................... *A01K 97/18* (2013.01)

(58) Field of Classification Search
CPC ...... A01K 83/00; A01K 83/06; A01K 83/061; A01K 83/064; A01K 83/066; A01K 83/069; A01K 85/02; A01K 85/021; A01K 85/022; A01K 85/025; A01K 97/18; A01K 97/00; G07F 11/20
USPC ........ 43/41, 42.1, 42.4, 42.42, 42.43, 43.16, 43/43.2, 43.6, 44.2, 44.8, 53.5, 4; 222/336, 386, 251, 386.5; 221/244, 268, 221/270, 272, 303, 208, 255, 260, 263, 221/267, 271, 276, 279, 307; 206/229, 206/230, 338

See application file for complete search history.

(56) References Cited

U.S. PATENT DOCUMENTS

| | | | |
|---|---|---|---|
| 989,392 A * | 4/1911 | Mueller | A01K 83/00 43/43.16 |
| 1,333,148 A | 3/1920 | Anderson | |
| 2,217,928 A | 10/1940 | Ward | |
| 2,601,852 A * | 7/1952 | Wendt | A61D 7/00 604/218 |
| 2,861,383 A * | 11/1958 | Gray | A01K 97/18 43/53.5 |
| 2,990,641 A | 7/1961 | Weidman | |
| 3,276,161 A | 10/1966 | Wagner | |
| 3,327,423 A | 6/1967 | Kotis | |
| 3,624,690 A | 11/1971 | Ashley | |
| 3,670,445 A * | 6/1972 | Borger | A01K 97/06 43/42.4 |
| 3,670,448 A | 6/1972 | Wehmeyer | |
| 4,353,481 A * | 10/1982 | Tando | H05K 13/0084 206/718 |
| 4,768,304 A | 9/1988 | Preiser | |
| 4,987,695 A | 1/1991 | Preiser | |
| 5,388,367 A * | 2/1995 | Rydell | A01K 85/02 43/42.42 |
| 5,921,016 A | 7/1999 | Shelton | |
| 5,934,009 A | 8/1999 | Trahan | |

(Continued)

*Primary Examiner* — Tien Q Dinh
*Assistant Examiner* — William L Gmoser
(74) *Attorney, Agent, or Firm* — McHale & Slavin, P.A.

(57) ABSTRACT

A device for removing a barbed fish hook from the mouth of a fish. The device consists of a support base for holding snippets used to disable the effectiveness of a fish hook barb. When a fish hook barb is disable the fish hook may be readily removed from the fish without further harm to the fish.

18 Claims, 6 Drawing Sheets

(56) References Cited

U.S. PATENT DOCUMENTS

| | | | |
|---|---|---|---|
| 6,014,831 A * | 1/2000 | Curry | A01K 83/00 |
| | | | 43/25.2 |
| 6,032,403 A | 3/2000 | Steck, III | |
| 6,138,401 A | 10/2000 | Duncan | |
| 6,672,476 B2 * | 1/2004 | Cash | F41A 9/84 |
| | | | 221/292 |
| 6,688,034 B1 | 2/2004 | Mantel | |
| 6,705,042 B1 | 3/2004 | Harrison | |
| 8,201,358 B2 | 6/2012 | Dohi | |
| 8,635,805 B1 * | 1/2014 | Schmunk | A01K 83/06 |
| | | | 221/208 |
| 9,737,060 B1 | 8/2017 | Racho | |
| 9,907,298 B2 | 3/2018 | White | |
| 2005/0278865 A1 * | 12/2005 | West | B26B 11/001 |
| | | | 7/106 |
| 2022/0217960 A1 | 7/2022 | Harrison | |

* cited by examiner

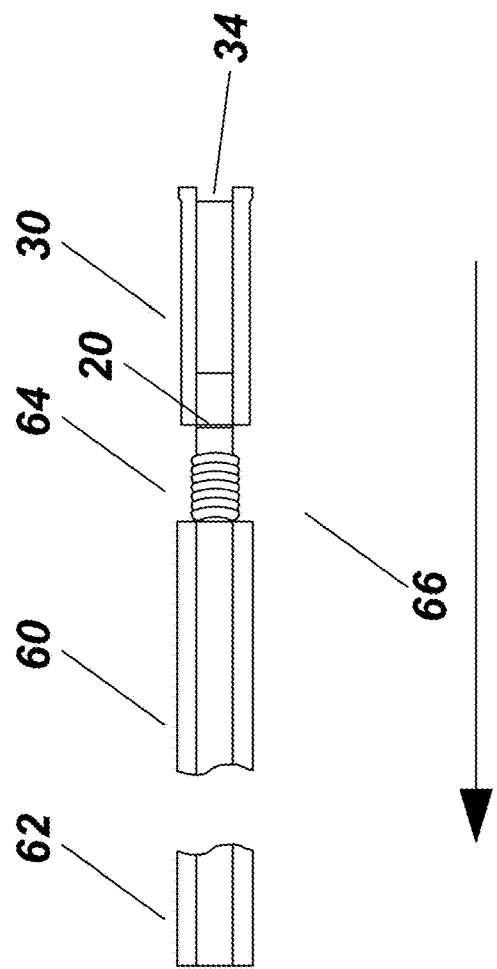
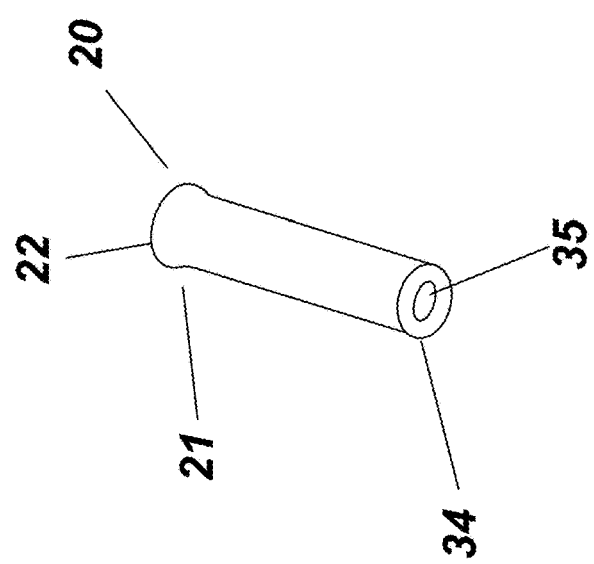
Fig. 4
Fig. 3

FISH HOOK BARB DISABLER

PRIORITY CLAIM

In accordance with 37 C.F.R. 1.76, a claim of priority is included in an Application Data Sheet filed concurrently herewith. Accordingly, the present invention claims priority as a continuation-in-part of U.S. patent application Ser. No. 17/173,261, entitled "FISH HOOK BARB DISABLER", filed on Feb. 11, 2021, which claims priority to U.S. Provisional Patent Application No. 63/135,359, entitled "FISH HOOK BARB DISABLER", and filed Jan. 8, 2021; the contents of which are incorporated herein by reference.

FIELD OF THE INVENTION

The present invention relates generally to the field of fishing and, more particularly, to a device for removing a barbed hook from the mouth of a fish.

BACKGROUND OF THE INVENTION

Sport and recreational fishing endeavors to catch and release fish with minimal harm to the fish. Numerous devices for catching fish have been introduced over the years, with the conventional barbed fish hook being the most prolific style of fishing tackle. The conventional hook consists of a pointed tip with a barb on one end before curving through a shank having an eye formed along a second for use in securing the hook to a fishing line. When a fish is hooked, the fish hook preferably catches the mouth of the fish with the shank on the inside of the mouth and the point/barb on the outside of the fish mouth. If the fish hook enters upside down it will protrude through the top of the fish head or often through the eye channel making removal of the fish hook difficult and hazardous, if not fatal to the fish. If the fish is to be released from the fish hook, the barb of the fish hook must be withdrawn without causing irreparable damage to the fish. While the barb of the fishing hook easily passes through soft tissue, the shape of the barb is designed to prevent removal. The barb shape allows for unidirectional passage of the barb, making a reverse direction difficult without harming the fish.

In addition, the surface of a fish does not allow the fisherman to leverage the hook from the mouth of the fish by fingers alone. Typically, a fisherman will remove a fish hook from the mouth of a fish using a pliers or the like tool. However, while the pliers facilitates removal in some instances, a fisherman will often yank the fish hook out of the fish's mouth which dislodges the fish hook but will damage the fish. In many instances the use of a pliers is cumbersome and ill-suited to the fish hook removal process. Besides damaging the fish, the pliers can damage the fish hook, causing the fisherman to secure a replacement fish hook including time spent on retying the fishing line.

Numerous disclosures address the problem presented by the conventional barb and provide various solutions. For instance, U.S. Pat. No. 1,333,148 discloses a wire that is placed over the fish hook barb to mask the point of the barb. U.S. Pat. No. 3,276,161 discloses a fish hook extractor that is slid over the shank of the fish hook. U.S. Pat. Nos. 2,217,928; 3,624,690; and 9,907,298 disclose retractable barbs. U.S. Pat. No. 8,201,358 discloses the use of a hook with grooves instead of barbs.

U.S. Pat. No. 6,032,403 discloses a hand held device for disengaging a fish hook from a fish's mouth using a through bored tubular body having a proximal end sized for manual gripping and a slot extending the length of the tubular body for aligning the slot with a fishing line.

U.S. Pat. No. 9,737,060 discloses a fish hook with at least one barb fixed to the fish hook with an epoxy that debonds upon the application of an electric current.

U.S. Pat. No. 6,138,401 discloses a fish hook remover having a spiral hook engaging flight. The spiral hook engaging flight is generated about an axis with a central hook shank receiving opening. A spiral line guide opening is defined by the flight that spirals into the central hook shank receiving opening such that a fish line engaged laterally by the flight will be guided into the central hook shank receiving opening.

U.S. Pat. No. 5,921,016 discloses a fish hook remover having a handle for a user to manipulate, a hook engagement member, and two rods which connect the handle and the hook engagement member.

U.S. Pat. No. 6,688,034 discloses a fish hook remover having a lengthwise base member, a combination handle, an actuation rod, and a rotary arm. The combination handle is attached to one end of the lengthwise base member and a yoke is formed on the other end of the lengthwise base member. A knob is attached to one end of the actuation rod and a rack is formed on the other end of the actuation rod.

U.S. Pat. No. 6,705,042 discloses an apparatus for extracting a fish hook from a fish having a support apparatus for placing over a fish hook embedded in a fish, an operative release member reciprocally removable relative to the position of the fish hook.

U.S. Pat. No. 3,670,448 discloses a fish hook locator-extractor for locating and extracting a fish hook using an elongated shank having a rounded pear-shaped handle at one end. The opposite end portion of the shank is hollow and terminates in a plurality of longitudinally extending, circumferentially spaced rounded projections separated by sharp V-shaped recesses.

U.S. Pat. No. 5,934,009 discloses a fish hook remover comprising a handle with an elongated hook removing member attached to the handle, wherein the hook removing member includes a V-shaped tip adapted to engage a hook; a hand guard attached to the handle, wherein the hand guard includes an outer periphery that is larger than the cross-sectional area of the handle; and a line looping member formed on the hand guard.

The above cited references all recognize the damage a barb will cause a fish using various fishing hooks. However, a conventional fish hook remains the most effective and least expensive alternative so it remains the most commonly used. What is needed in the field is a device capable of disabling the barb on a conventional fish hook, allowing ease of fish hook removal without damaging the fish or the fish hook.

SUMMARY OF THE INVENTION

A barbed fish hook removing device consisting of a tubular shaped flexible plastic or rubber snippet that is slid over a fishing hook tip and barb, wherein the snippet disables the effectiveness of the barb. When the snippet is in position, the fish hook can be readily removed from the mouth of the fish without further harm to the fish. The snippet is constructed of a flexible plastic or rubber tubing that conforms to the shape of the barb. In one embodiment, the snippet is held by a circular shaped support base having a receptacle for receipt of discarded snippets. In another embodiment, the snippets are placed within a support base for release as needed.

It is therefore an objective of this invention to provide a fish hook removing device that can remove a fish hook from the mouth of a fish with little or no damage to the fish.

Another objective of the invention is to teach the use of a barbed fish hook removing device that consists of a tubular shaped flexible plastic or rubber snippet that is slid over a fishing hook tip and barb wherein the snippet disables the effectiveness of the barb.

Another objective of the invention is to teach the use of a support base having a plurality of channels formed along a perimeter thereof for receipt of stems, each stem having a proximal end releasably attached to the channel and the distal end that extends outwardly for holding of a snippet.

Still another objective of the invention is to teach the use of a support base having a single channel with a plurality of snippets placed therein, each snippet is released upon engagement with a fishing hook.

Yet still another objective of the invention is to provide a receptacle allowing for the one-way insertion of spent snippets for later disposal.

Another objective of the invention is to provide a support base constructed of a buoyant material having a specific gravity sufficient to float.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

BRIEF DESCRIPTION OF THE FIGURES

FIG. 3 is a perspective view of a stem;

FIG. 4 is a side view of a handle for dispensing a snippet from a distance;

DETAILED DESCRIPTION OF THE INVENTION

Figure 2:
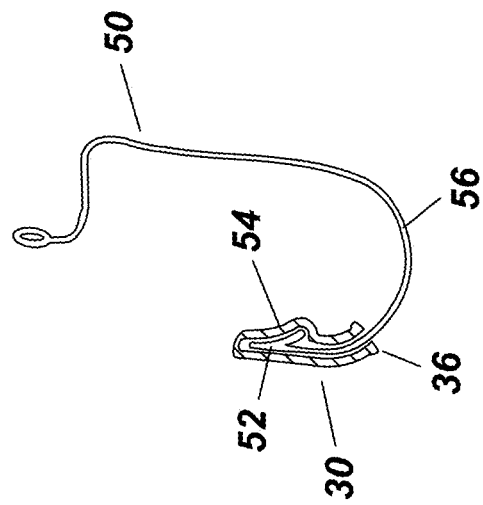
FIG. 2 is a pictorial view of a fish hook with a snippet covering the tip and barb.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 1:
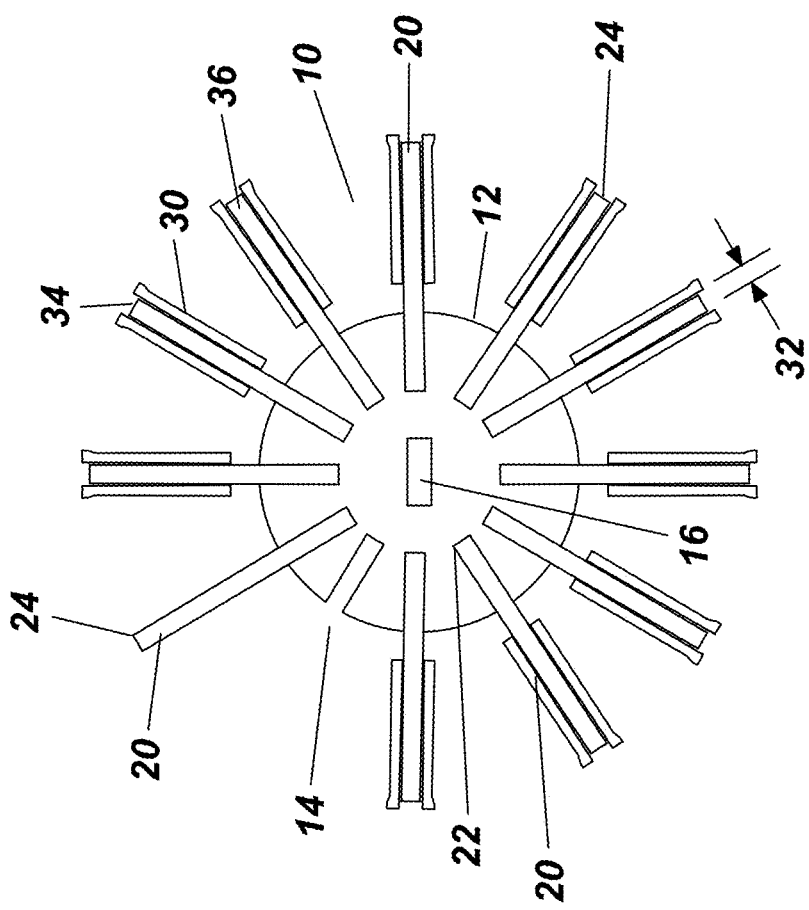
FIG. 1 is a top view of a support base of the instant invention.

Now referring to FIGS. 1-4, illustrated is first embodiment of a device to disable a fish hook barb. The device includes a support base 10 having a circular shaped perimeter 12 with a plurality of channels 14 formed therein. Each channel 14 receives a stem 20 having a proximal end 22 and a distal end 24. The proximal end 22 of each stem 20 is releasably attached to the channel 14 and the distal end 24 extends outwardly from the perimeter 12. In a preferred embodiment, the proximal end 22 includes a tab 21 providing a tactile feel for insertion and removal. The distal end 34 of the stem 20 includes an indent 35 sized to accept no more one half of a fish hook barb wherein a snippet will engage a reverse point on the fish hook barb before pulling away from the stem.

A snippet 30 formed from a flexible plastic or rubber tube is slidably attached to the distal end 34 of each stem 20; the snippet 30 having an inner diameter 32 sized to frictionally engage a conventional fishing hook 50 comprising a tip 52 and barb 54. The snippet 30 is a soft flexible material that will easily stretch allowing it to side over the tip 52 of the fish hook 50 and immediately conform to diameter of the fish hook 50. The support base 10 is constructed of a buoyant material having a specific gravity sufficient to allow the support base to float in fresh or salt water. The snippets 30 are transparent and flexible that allows the slidable placement of the snippet 30 over the barb 54 and visual confirmation that the barb is covered. The snippet 30 cannot be pulled off the barb, however, the snippet 30 can rotated to allow unscrewing of the snippet. The support base 10 is hollow, forming a receptacle 16 for receipt of spent snippets to be discarded. It should also be noted that the snippet can remain on the fish hook when the fishing gear is in storage. The snippet 30 protects the fish hook 50 from causing injury to an individual, and allows safe storage without fear of an individual being snagged by a fish hook.

If a fish hook 50 engages a fish, the tip 52 and barb 54 of the fish hook would extend through the thin membrane in the side or bottom of the mouth which is easily removed. However, if the fish hook enters upside down it will protrude through the top of the head or often through the eye socket making removal difficult and hazardous, if not fatal to the fish. In some fish hooking the bottom of the mouth is also difficult to remove. The instant device will assist in a safer removal of the hook to minimize further damage to the fish by facilitating a quick and effortless release. For example, a fisherman looking to release a fish would grasp the support base 10 and align a snippet 30 to the tip 52 of the fish hook 50. The end 34 of the stem 20 is indented 35 and allows ease of aligning the opening 36 of the snippet 30 with the tip 52 of the fish hook 50. The indent is sized to accept no more one half of a fish hook barb wherein said snippet will engage a reverse point on the fish hook barb before pulling away from the stem 20. The individual would then grasp the snippet 30, sliding it off the stem 20 and onto the tip 52 and barb 54 of the fish hook 50. The snippet conforming to shape of the fish hook. The barb 54 causes a unidirectional placement of the snippet 30 for the same reason the barb will not readily reverse direction when hooked on a fish. Once the snippet 20 is placed over the tip 52 and barb 54, the barb is disabled and the fish hook 50 can be readily removed from the fish. Once the fish hook 50 has been removed from the fish, the snippet 30 can remain on the hook for protection during storage, or be removed from the fish hook 50 by rotating the snippet 30 at the same time the snippet 30 is pulled which creates a rotational unscrewing effect. If a snippet 30 is spent, the snippet 30 can be placed into the receptacle 16 in the support base 10 for subsequent disposal.

In one embodiment, the stems 20 are constructed and arranged to engage the channels 14, allowing the stems 20 to be removed by grasping the distal end 34 of the stem 20. Alternatives to frictional engagement would be the use of a tab, not shown, formed in the stem channel to allow the stem to snap in and out.

Referring to FIG. 4, a stem 20 having a snippet 30 may be attached to an extension handle 60 that is about 10" long. The extension handle 60 provides an extension to the support base 10 for fish hooks 50 that have been swallowed by the fish. For instance, a fisherman grasps the end 62 of the extension handle 60 and aligns it with the opening 36 of the snippet 30 with the tip 52 of a fish hook 50. Once aligned, the handle 60 is pushed toward the tip 52, wherein a spring 64 assists in pushing the snippet 30 over the fish hook barb 54. The handle 60 operates as an extension to the support base 10 for those harder to reach fish hooks. Once the snippet 30 is attached to the fish hook 50, a catch 66 formed in the side of the handle 60 is used to engage the shank 56 of the fish hook 50 to dislodge the fish hook 50 from the fish. It is noted that the length of the handle 60 allows for a deep insertion into a fish with the catch 66 available to dislodge the fish hook 50 once the barb 54 has been disabled. The handle 60 is constructed of a buoyant material having a specific gravity sufficient to allow the handle 60 to float.

Figure 5:
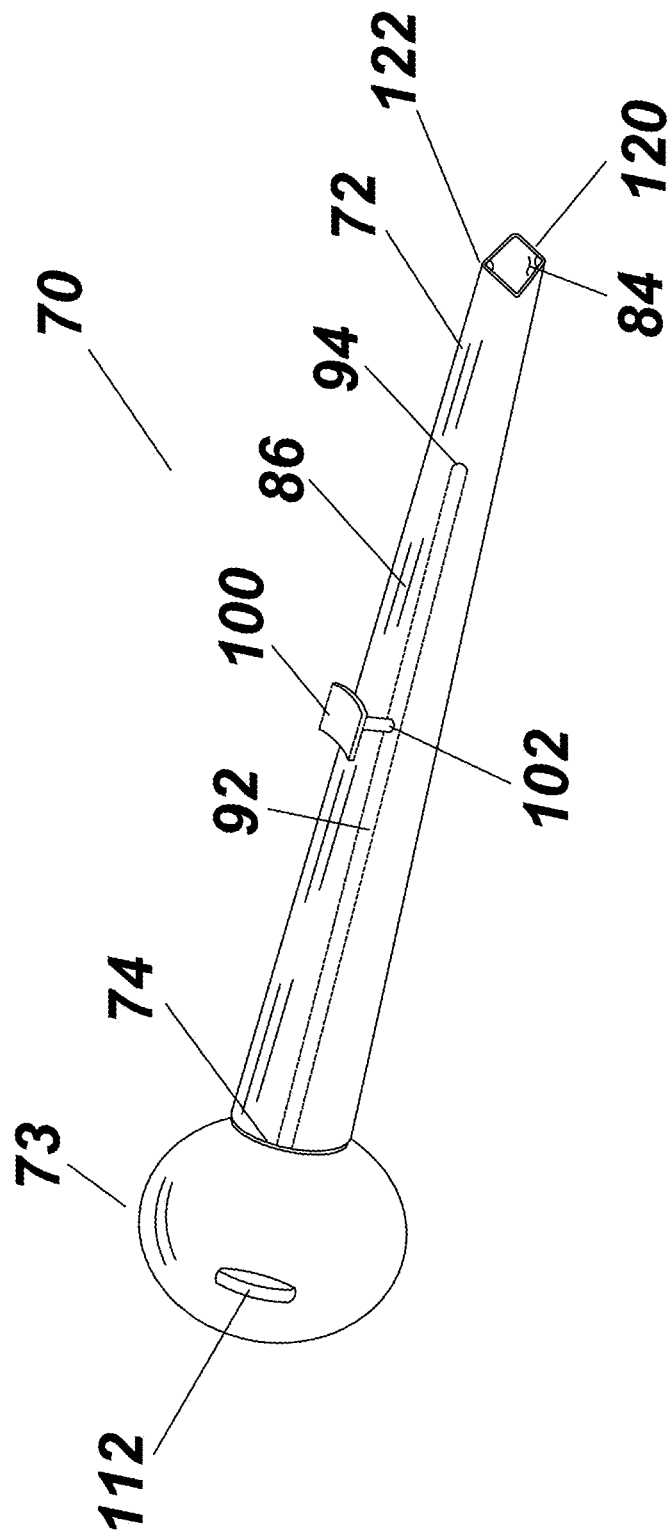
FIG. 5 is a perspective view of an alternative handle for dispensing a snippet.
Figure 6:
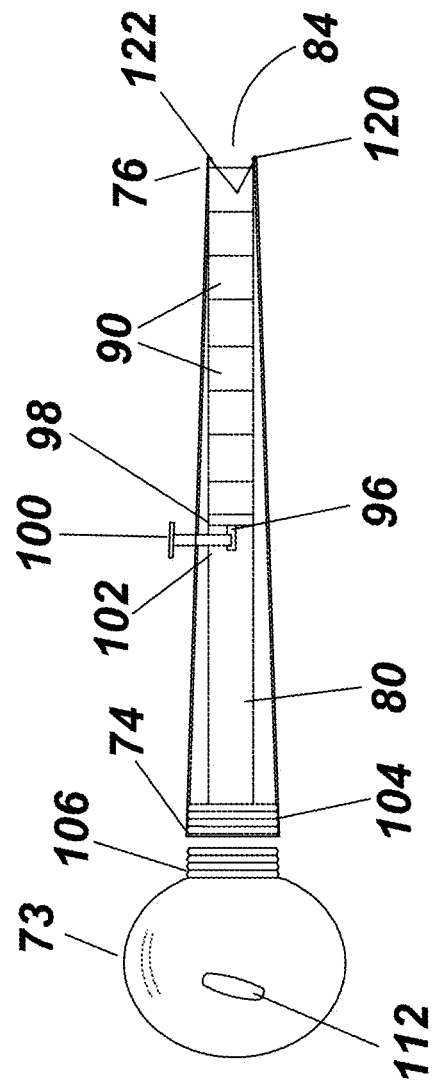
FIG. 6 is a cross sectional side view of the handle.
Figure 7A:
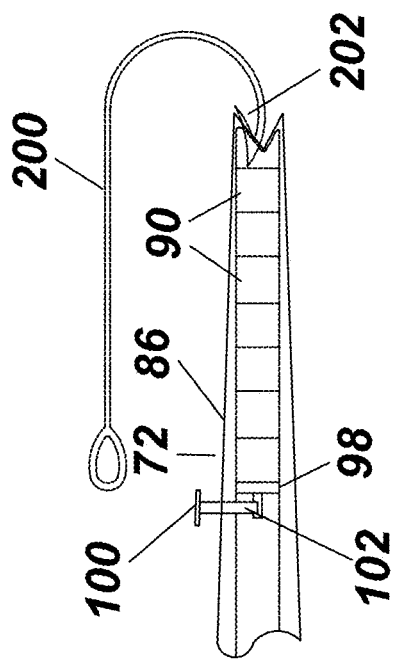
FIG. 7A is a cross sectional side view of the handle engaging a fish hook barb.
Figure 7B:
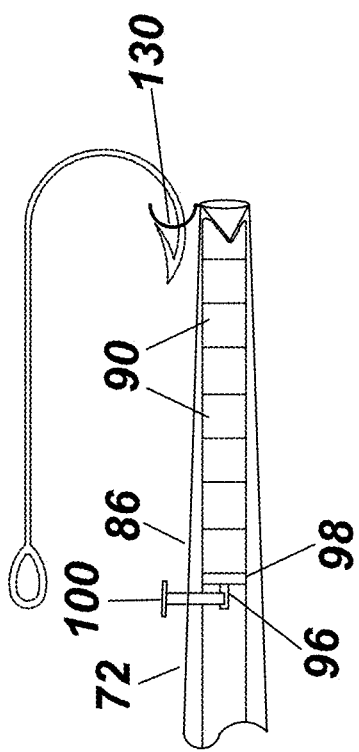
FIG. 7B is a cross sectional side view of the handle having a hook for engaging a fish hook.
Figure 8:
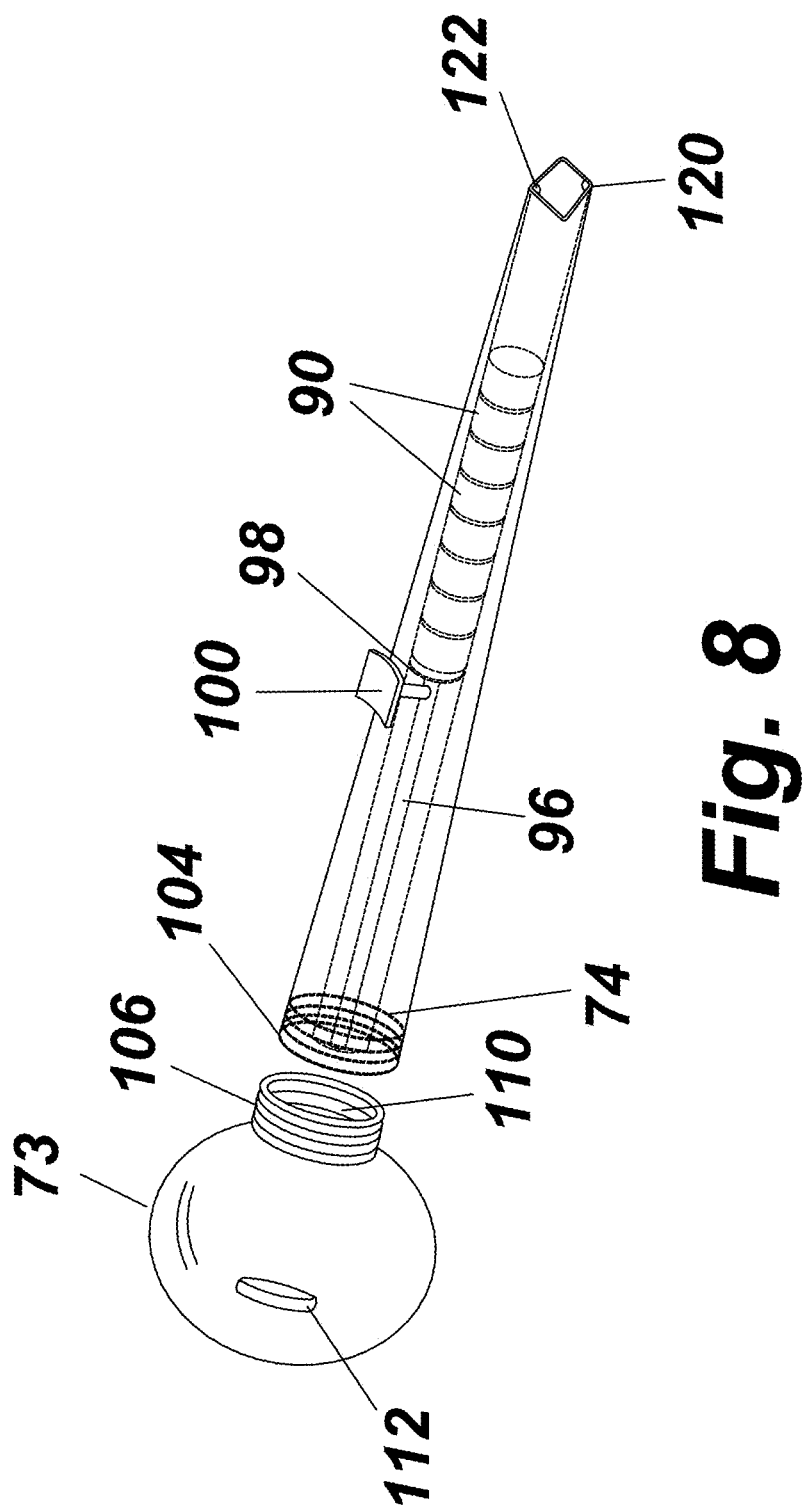
FIG. 8 is a cross sectional perspective view of the handle.

Now referring to FIGS. 5-8, illustrated is an alternative embodiment to disable a fish hook barb. In this embodiment, the device 70 is formed from a support base 72 and an end cap member 73. The support base 72 having a substantially circular body with a proximate end 74 and a distal end 76 and a chamber 80 extending therebetween. In one embodiment the chamber 80 has an inlet 82 extending to an outlet 84 wherein a plurality of snippets 90 are stored within the chamber 80. The sidewall 86 of the support base 72 includes an access slot 92 extending from the proximal end 74 to an endpoint 94 juxtapositioned to the distal end 76. The access slot allows a push rod mechanism 96 to be slid along the length of the chamber 80. The push rod mechanism 96 having a faceplate 98 to be moved along the length of the chamber 80 by movement of a lever 100. The lever 100 is constructed and arranged to be moved as needed by a user's thumb, the lever 100 coupled to the push rod 96 by a stem 102 that extends through the access slot 92.

The end cap member 73 is hollow forming a receptacle 110 for receipt of spent snippets 90. A spent snippet occurs once a fish hook barb has been disabled, and the fish hook removed from the fish, wherein the fish hook can be reused and the spent snippet disposed of. The receptacle 110 includes an opening 112 allowing for the one-way insertion of used snippets into the receptacle 110. When the end cap member 73 is threaded to the support base 72, the end cap member 73 operates as a hand grip. The proximal end 74 having threads 104 operatively associated with reciprocal thread 106 formed on the end cap member.

The size of the end cap member 73 and support base can be made specifically to operate best with a range of fish and/or hook sizes. For instance, a tarpon fish caught on a fishing hook may be substantially larger than a snapper fish. The end cap member 73 and support base 72 may be sized in accordance with the size of fish to be entertained.

Channel tabs 120, 122 provide frictional engagement of adjoining snippets 90 to assist in separation of a snippet when a fishing hook barb 202 is engaged. As with the previous embodiment, the support base is constructed of a buoyant material having a specific gravity sufficient to allow said support base to float.

The snippet 90 is formed from a flexible plastic or rubber tube with an inner diameter sized to frictionally engage a conventional fishing hook 200. The snippet 90 is a soft flexible material that will easily stretch allowing it to side over the barb 202 of the fish hook and immediately conform to diameter of the fish hook. In the preferred embodiment, the snippets 90 are transparent and flexible that allows the slidable placement over the fishing hook barb and visual confirmation that the barb is covered. The snippet 90 cannot be pulled off the barb, however, the snippet can rotated to allow unscrewing of the snippet. The end cap member 73 is hollow, forming a receptacle for receipt of spent snippets to be discarded. It should also be noted that the snippet can remain on the fish hook when the fishing gear is in storage. The snippet 90 protects the fish hook from causing injury to an individual, and allows safe storage without fear of an individual being snagged by a fish hook.

The instant device will assist in a safer removal of the hook to minimize further damage to the fish by facilitating a quick and effortless release. For example, a fisherman looking to release a fish would grasp the end cap member 73 and align the support base 72 to engage a snippet 90. The distal end 76 is shaped and allows ease of aligning the opening 84 with the fish hook 200. The opening 84 is sized to accept no more one half of a fish hook barb wherein said snippet will engage a reverse point on the fish hook barb before pulling away from the support base 72. The snippet conforming to shape of the fish hook. The fish hook barb 202 causes a unidirectional placement of the snippet 90 for the same reason the barb will not readily reverse direction when hooked on a fish. Once the snippet 90 is placed over the barb 202, the barb is disabled and the fish hook can be readily removed from the fish. Once the fish hook has been removed from the fish, the snippet 90 can remain on the hook for protection during storage, or be removed from the fish hook by rotating the snippet at the same time the snippet is pulled which creates a rotational unscrewing effect. If a snippet 90 is spent, the snippet can be placed into the receptacle 73 for subsequent disposal. A semicircular catch 130 can be fastened to, or formed integral with, the sidewall 86 of the support base 72. The catch 130 can be used to engage a fish hook for dislodgement of the fish hook. The catch 130 provides an alternative to the shaped opening 84.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A device to disable a fish hook barb comprising:
   a support base having substantially circular body with a proximal end and a distal end;

a channel extending between said proximal end and said distal end, said channel having an inlet and an outlet;

a plurality of snippets slidably positioned within said channel, said snippet having an inner diameter sized to frictionally engage a fishing hook tip and barb; and a push rod mechanism for position said snippets along the length of said channel, and an end cap member threadingly attached to said proximal end of said support base;

wherein said outlet of said channel is sized for receipt of said fish hook barb wherein said snippet is moved over the barb by positioning of said push rod whereby a snippet engages the barb, removal of said fish hook barb from said channel dislodges the snippet.

2. The device according to claim 1 including a channel tab formed in said outlet of said channel, said channel tab providing frictional engagement of adjoining snippets to assist in separation of a snippet when a fishing hook barb is engaged.

3. The device according to claim 1 including a lever attached to said push rod mechanism and position along an outer surface of said support base, said lever constructed and arranged to allow movement of said push rod mechanism by a users thumb.

4. The device according to claim 1 wherein said end cap member includes a receptacle for receipt of spent snippets.

5. The device according to claim 4 wherein said receptacle includes an opening allowing for the one-way insertion of used snippets into said receptacle.

6. The device according to claim 1 wherein said snippet is constructed of flexible plastic or rubber tube sized to slide over a fish hook barb.

7. The device according to claim 1 wherein said support base is constructed of a buoyant material having a specific gravity sufficient to allow said support base to float.

8. The device according to claim 1 wherein said support base includes a semi-circular catch secured along the distal end of the support base for use as a tool in removing said fish hook barb from the mouth of a fish.

9. A device to disable a fish hook barb comprising:

a support base having substantially circular body with a proximal end and a distal end;

a channel extending between said proximal end and said distal end, said channel having an inlet and an outlet;

at least one channel tab formed in said outlet of said channel;

a plurality of snippets slidably positioned within said channel, said snippet having an inner diameter sized to frictionally engage a fishing hook tip and barb; and a push rod mechanism for position said snippets along the length of said channel, and an end cap member threadingly attached to said proximal end of said support base;

wherein said outlet of said channel is sized for receipt of said fish hook barb wherein said snippet is moved over the barb by positioning of said push rod whereby a snippet engages the barb, said channel tab providing frictional engagement of adjoining snippets to assist in separation of a snippet when a fishing hook barb is engaged and removed from said opening.

10. The device according to claim 9 including a lever attached to said push rod mechanism and position along an outer surface of said support base, said lever constructed and arranged to allow movement of said push rod mechanism by a users thumb.

11. The device according to claim 9 wherein said end cap member includes a receptacle for receipt of spent snippets and an opening allowing for insertion of spent snippets into said receptacle.

12. The device according to claim 9 wherein said snippet is constructed of flexible plastic or rubber tube sized to slide over a fish hook barb.

13. The device according to claim 9 wherein said support base is constructed of a buoyant material having a specific gravity sufficient to allow said support base to float.

14. The device according to claim 9 wherein said support base includes a semi-circular catch secured along the distal end of the support base for use as a tool in removing said fish hook barb from the mouth of a fish.

15. A device to disable a fish hook barb comprising:

a support base having substantially circular body with a proximal end and a distal end;

a channel extending between said proximal end and said distal end, said channel having an inlet and an outlet;

at least one channel tab formed in said outlet of said channel;

a plurality of snippets slidably positioned within said channel, said snippet having an inner diameter sized to frictionally engage a fishing hook tip and barb; and a push rod mechanism for position said snippets along the length of said channel, including a lever attached to said push rod mechanism and position along an outer surface of said support base, said lever constructed and arranged to allow movement of said push rod mechanism by a users thumb; and an end cap member threadingly attached to said proximal end of said support base said end cap member includes a receptacle for receipt of spent snippets;

wherein said outlet of said channel is sized for receipt of said fish hook barb wherein said snippet is moved over the barb by positioning of said push rod whereby a snippet engages the barb, said channel tab providing frictional engagement of adjoining snippets to assist in separation of a snippet when a fishing hook barb is engaged and removed from said opening.

16. The device according to claim 15 wherein said snippet is constructed of flexible plastic or rubber tube sized to slide over a fish hook barb.

17. The device according to claim 15 wherein said support base is constructed of a material having a specific gravity sufficient to allow said support base to float.

18. The device according to claim 15 wherein said support base includes a semi-circular catch secured along the distal end of the support base for use as a tool in removing a fish hook from the mouth of a fish.

\* \* \* \* \*